United States Patent
Sawa

(10) Patent No.: US 10,220,544 B2
(45) Date of Patent: Mar. 5, 2019

(54) KNEADING APPARATUS HAVING PLURALITY OF SEGMENTED PARTS

(71) Applicant: Kohei Sawa, Osaka (JP)

(72) Inventor: Kohei Sawa, Osaka (JP)

( * ) Notice: Subject to any disclaimer, the term of this patent is extended or adjusted under 35 U.S.C. 154(b) by 40 days.

(21) Appl. No.: 15/303,858

(22) PCT Filed: Apr. 21, 2015

(86) PCT No.: PCT/JP2015/062108
§ 371 (c)(1),
(2) Date: Oct. 13, 2016

(87) PCT Pub. No.: WO2015/163320
PCT Pub. Date: Oct. 29, 2015

(65) Prior Publication Data
US 2017/0043502 A1    Feb. 16, 2017

(30) Foreign Application Priority Data

Apr. 22, 2014    (JP) .................. 2014-087888

(51) Int. Cl.
*B29B 7/42*      (2006.01)
*B29C 47/00*     (2006.01)
(Continued)

(52) U.S. Cl.
CPC ............ *B29B 7/42* (2013.01); *B29C 47/0825* (2013.01); *B29C 47/0854* (2013.01);
(Continued)

(58) Field of Classification Search
CPC ... B29B 7/42; B29C 47/6087; B29C 47/0825; B29C 47/6056; B29C 47/0009; B29C 47/6031; B29C 47/0854
(Continued)

(56) References Cited

U.S. PATENT DOCUMENTS 4,752,135 A * 6/1988 Loomans ................ B29B 7/482
366/297
5,590,959 A    1/1997 Ueda et al.
(Continued)

FOREIGN PATENT DOCUMENTS

DE    43 43 289    6/1994
EP    2 610 041    7/2013
(Continued)

OTHER PUBLICATIONS

International Search Report dated Jul. 21, 2015 in International (PCT) Application No. PCT/JP2015/062108.
(Continued)

*Primary Examiner* — Charles Cooley
(74) *Attorney, Agent, or Firm* — Wenderoth, Lind & Ponack, L.L.P.

(57) ABSTRACT

A kneading apparatus having a kneading unit made up of a plurality of segment parts detachably mounted on a shaft disposed in the barrel includes a first segment part having a first length L1 related to an outer diameter D, a second segment part having a second length L2 shorter than the first length L1, and a third segment part having a third length L3 longer than the first length L1; the first length L1 is [the outer diameter D×a coefficient a]; the second length L2 is [the first length L1/a coefficient b]; the third length L3 is [the first length L1×the coefficient b]; the third length L3 is [L1+L2]; and the kneading unit has a segment pattern made up of a plurality of segment parts and mounted on the shaft interchangeably with another segment pattern.

5 Claims, 5 Drawing Sheets

(51) Int. Cl.
B29C 47/08 (2006.01)
B29C 47/60 (2006.01)

(52) U.S. Cl.
CPC ...... *B29C 47/6056* (2013.01); *B29C 47/6087* (2013.01); *B29C 47/0009* (2013.01); *B29C 47/6031* (2013.01)

(58) Field of Classification Search
USPC ............... 366/79–91; 425/204, 208, 209
See application file for complete search history.

(56) References Cited

U.S. PATENT DOCUMENTS

| | | | | |
|---|---|---|---|---|
| 5,851,065 | A * | 12/1998 | Ikeda | B29B 17/00 366/76.5 |
| 6,048,088 | A * | 4/2000 | Haring | B29C 47/0825 366/85 |
| 6,682,213 | B2 * | 1/2004 | Inoue | B29B 7/481 366/76.4 |
| 6,783,270 | B1 * | 8/2004 | Padmanabhan | B29C 47/0861 366/82 |
| 2002/0093118 | A1 * | 7/2002 | Inoue | B29B 7/481 264/211.23 |
| 2003/0128624 | A1 | 7/2003 | Inoue et al. | |
| 2004/0209977 | A1 * | 10/2004 | Hossan | B29C 47/0014 523/324 |
| 2006/0003042 | A1 * | 1/2006 | Inoue | B29C 47/0011 425/204 |
| 2009/0213683 | A1 * | 8/2009 | Fukutani | B29B 7/483 366/82 |
| 2010/0091603 | A1 | 4/2010 | Yamane et al. | |
| 2014/0149089 | A1 | 5/2014 | Hirata et al. | |
| 2017/0043502 | A1 * | 2/2017 | Sawa | B29C 47/0825 |

FOREIGN PATENT DOCUMENTS

| | | | | |
|---|---|---|---|---|
| JP | 6-8305 | | 1/1994 | |
| JP | 8-1660 | | 1/1996 | |
| JP | 10-310647 | | 11/1998 | |
| JP | 2003-245534 | | 9/2003 | |
| JP | 2004174860 | A * | 6/2004 | ......... B29C 47/6031 |
| JP | 2005-138567 | | 6/2005 | |
| JP | 2008-132672 | | 6/2008 | |
| JP | 2009-78361 | | 4/2009 | |
| JP | 2012-45866 | | 3/2012 | |

OTHER PUBLICATIONS

English translations of the International Preliminary; Report on Patentability and Written Opinion of the International Searching Authority dated Nov. 3, 2016 in International (PCT) Application No. PCT/JP2015/062108.
Extended European Search Report dated Mar. 19, 2018 in European Application No. 15782278.4.

* cited by examiner

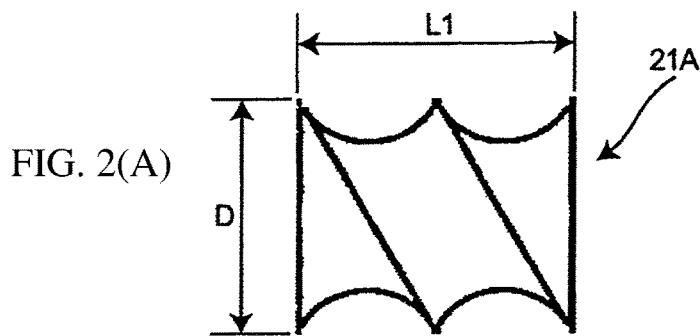
FIG. 2(A)
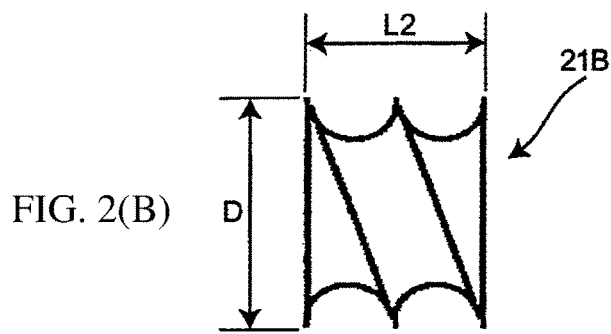
FIG. 2(B)
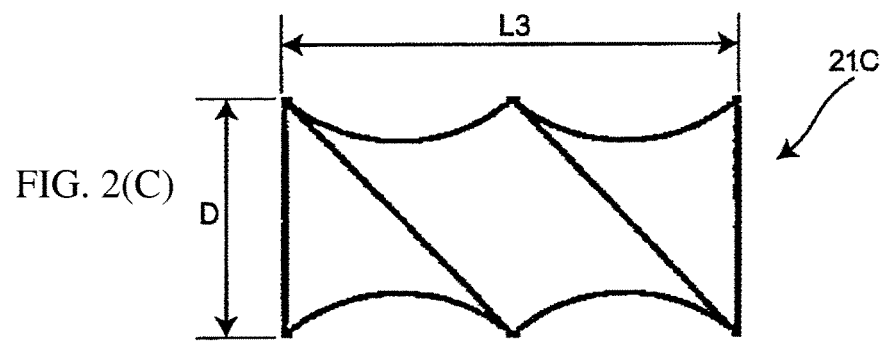
FIG. 2(C)
Fig. 3
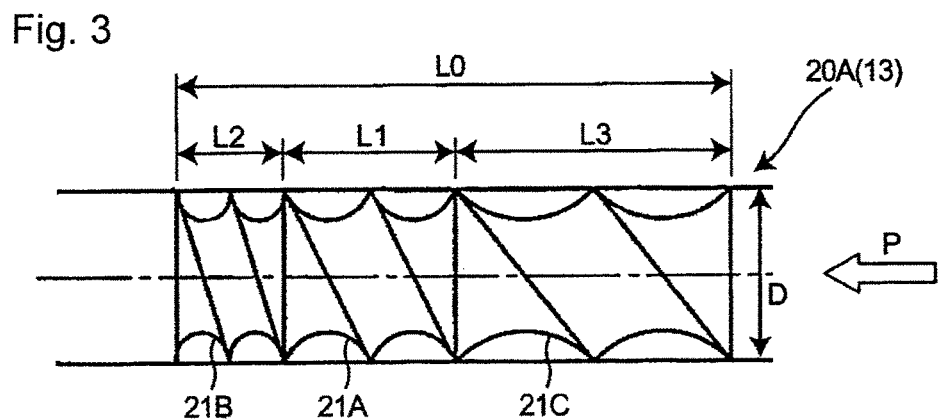

KNEADING APPARATUS HAVING PLURALITY OF SEGMENTED PARTS

TECHNICAL FIELD

The present invention relates to a kneading apparatus performing a kneading treatment for a kneaded material supplied in a barrel and, more particularly, to a kneading apparatus including a kneading unit made up of a plurality of segment parts detachably mounted on a shaft disposed in the barrel.

BACKGROUND ART

Apparatuses with various configurations are conventionally known as a kneading apparatus performing a kneading treatment for a kneaded material. A kneading unit in such a kneading apparatus is made up of components such as a screw element primary intended for transportation of the kneaded material and a kneading block primary intended for kneading. These components are referred to as segment parts, and a plurality of segment parts is selectively combined and mounted on a shaft (e.g., a spline shaft) so as to configure the kneading unit having required specifications/functions (see, e.g., Patent Document 1).

To selectively combine and mount a plurality of segment parts on the shaft in this way, these segment parts are prepared as parts having a plurality of predefined lengths. For example, three types of parts having the lengths of 30 mm, 45 mm, and 60 mm are prepared as screw segment parts having the outer diameter of 50 mm and, three types of parts having the lengths of 50 mm, 80 mm, and 100 mm are prepared as screw segment parts having the outer diameter of 90 mm.

PATENT DOCUMENT

Patent Document 1: JP 2008-132672 A

SUMMARY OF THE INVENTION

Problems to be Solved by the Invention

However, for such a conventional kneading apparatus, a plurality of types of segment parts having the same outer diameter is produced to have easily produced and managed lengths, for example, lengths that are integer multiples of 5 mm, which reduces correlation between segment parts having the same outer diameters. Therefore, if segment parts different in length are selected and mounted on a shaft, an assembling length may vary depending on a combination of the selected segment parts, causing a problem of significant limitations on selectable segment parts.

When a large kneading apparatus is produced, a small kneading apparatus is first produced and verified in terms of performance and is then scaled up to produce the large kneading apparatus in some cases. However, since the lengths of the segment parts are set to the lengths facilitating dimension management for each outer diameter thereof, the absence of similarity relation between a small segment part and a large segment part causes a problem of uncertainty on whether scaling-up of the apparatus can achieve a scaled-up performance.

It is therefore an object of this disclosure to solve the problems and to provide a kneading apparatus that includes a kneading unit made up of a plurality of segment parts detachably mounted on a shaft disposed in a barrel, that reduces limitations on selection or interchange of segment parts, and that includes a segment part configuration with consideration given to scaling up or down of the apparatus.

Means for Solving Problem

An aspect of this disclosure provides a kneading apparatus including a barrel; a shaft disposed and rotationally driven in the barrel; and a kneading unit made up of a plurality of segment parts detachably mounted on the shaft, wherein the plurality of the segment parts includes a first segment part having an outer diameter D and a first length L1 related to the outer diameter D, a second segment part having the outer diameter D and a second length L2 shorter than the first length L1, and a third segment part having the outer diameter D and a third length L3 longer than the first length L1, the first length L1 is [the outer diameter D×a coefficient a], the second length L2 is [the first length L1/a coefficient b], the third length L3 is [the first length L1×the coefficient b], and the third length L3 is [the first length L1+the second length L2], wherein the kneading unit has a segment pattern made up of a plurality of segment parts mounted on the shaft, and the segment pattern is mounted on the shaft such that either a first segment pattern including the first and second segment parts or a second segment pattern including the third segment part is interchangeable with the other pattern.

Effect of the Invention

An aspect of this disclosure enables the kneading apparatus including a kneading unit made up of a plurality of segment parts to reduce limitations on selection or interchange of segment parts and to implement a segment part configuration with consideration given to scaling up or down of the apparatus.

BRIEF DESCRIPTION OF DRAWINGS

FIGS. 2(A)-(C) are side views of segment parts used in the kneading apparatus of this embodiment.

FIG. 3 is a configuration diagram of a segment pattern 20A of the kneading apparatus of this embodiment.

EMBODIMENT(S) FOR CARRYING OUT THE INVENTION

A kneading apparatus of a first aspect of this disclosure includes a barrel, a shaft disposed and rotationally driven in the barrel, and a kneading unit made up of a plurality of segment parts detachably mounted on the shaft; the plurality of the segment parts includes a first segment part having an outer diameter D and a first length L1 related to the outer diameter D, a second segment part having the outer diameter D and a second length L2 shorter than the first length L1, and a third segment part having the outer diameter D and a third length L3 longer than the first length L1; the first length L1 is [the outer diameter D×a coefficient a]; the second length L2 is [the first length L1/a coefficient b]; the third length L3 is [the first length L1×the coefficient b]; the third length L3 is [the first length L1+the second length L2]; the kneading unit has a segment pattern made up of a plurality of segment parts mounted on the shaft; and the segment pattern is mounted on the shaft such that either a first segment pattern including the first and second segment parts or a second segment pattern including the third segment part is interchangeable with the other pattern.

A kneading apparatus of a second aspect of this disclosure is the kneading apparatus of the first aspect in which the length of the second segment pattern in an axial direction of the shaft is equal to the length of the first segment pattern.

A kneading apparatus of a third aspect of this disclosure is the kneading apparatus of the first or second aspect in which each of the segment parts is a screw element or a kneading block.

A kneading apparatus of a fourth aspect of this disclosure is the kneading apparatus of any one of the first to third aspects in which the first to third segment parts are screw elements having the same pitch number.

A kneading apparatus of a fifth aspect of this disclosure is the kneading apparatus of any one of the first to third aspects in which the segment parts are screw elements having the same number S of screw threads and further include a short segment part or a long segment part having a length acquired by multiplying any of the first to third lengths L1, L2, L3 of the first to third segment parts by n/S (n is a natural number) and the short segment part or the long segment part is included in at least one of the first and second segment patterns.

An embodiment according to this disclosure will hereinafter be described in detail with reference to the drawings. The present invention is not limited to this embodiment.
(Embodiment)
(Configuration of Kneading Apparatus)

Figure 1:
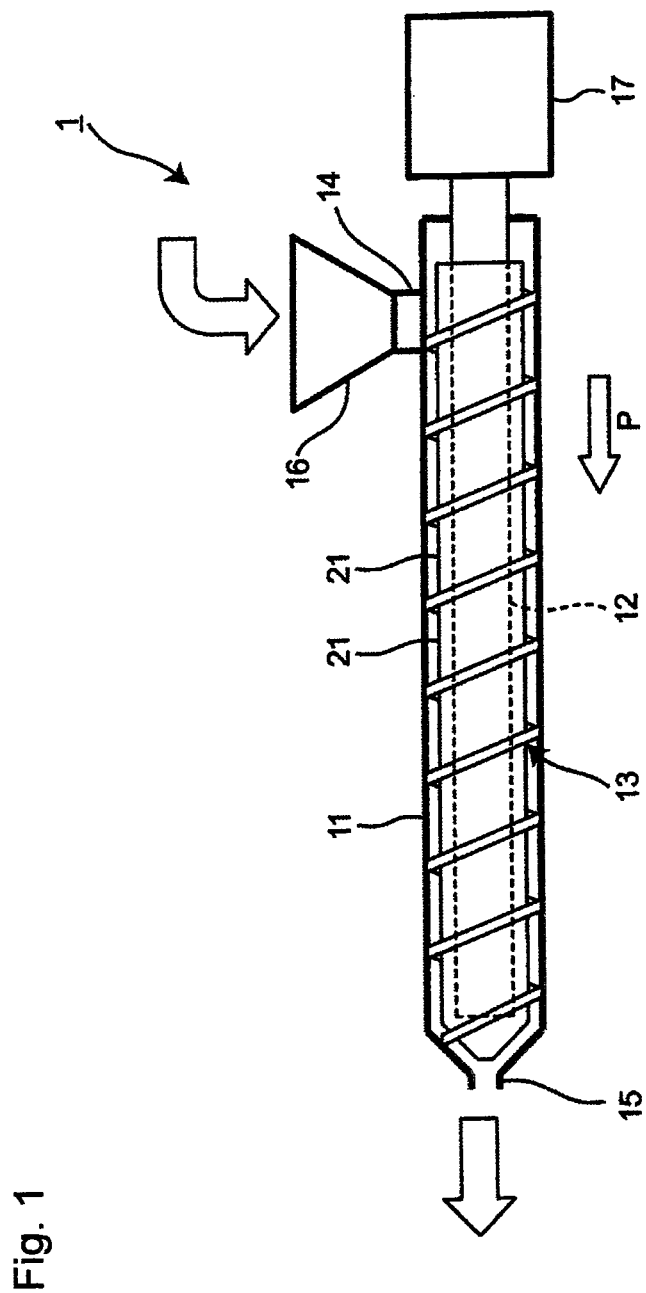
FIG. 1 is a schematic configuration diagram of a kneading apparatus according to an embodiment of this disclosure.

A configuration of a kneading apparatus 1 according to an embodiment of this disclosure is shown in a schematic configuration diagram of FIG. 1. FIG. 1 shows only a main configuration of the kneading apparatus 1 of this embodiment without showing a detailed configuration.

As shown in FIG. 1, the kneading apparatus (or kneading/extruding apparatus) 1 includes a barrel 11, a shaft 12 disposed and rotationally driven in the barrel 11, and a kneading unit 13 made up of a plurality of segment parts detachably mounted on the shaft 12.

The barrel 11 has a generally cylindrical shape and has a raw material input port 14 disposed on a cylindrical circumferential surface near one end for inputting a raw material to be kneaded in the kneading apparatus 1, and a barrel extrusion port 15 disposed at the other end as an outlet port of a kneaded material acquired by a kneading treatment to the raw material. The raw material input port 14 of the barrel 11 is provided with a hopper 16 acting as a raw material supplying apparatus. The raw material subjected to the kneading treatment in the kneading apparatus 1 is not limited to a solid and may be a liquid or a fluid, or may be a mixture material of a plurality of raw materials. The raw material supplying apparatus may be in any form capable of supplying a raw material, and other various configurations such as a feeder is applicable without being limited to the hopper.

The shaft 12 is located in an internal space of the barrel 11 having a generally cylindrical shape and is a spline shaft, for example. The shaft 12 is connected at one end to a rotary drive apparatus 17 so that the shaft 12 is rotationally driven by the rotary drive apparatus 17. The rotary drive apparatus 17 includes a drive motor (not shown) and a gear mechanism (not shown) converting the number of rotations of the drive motor to the set number of rotations and transmitting the rotary drive force to the shaft 12.

The kneading unit 13 is made up of a plurality of segment parts 21 detachably mounted on the outer circumference of the shaft 12. The kneading apparatus 1 shown in FIG. 1 represents an example of the kneading unit 13 configured by using screw elements as the plurality of the segment parts 21. The segment parts include the screw elements primary intended for transportation of a kneaded material as well as kneading blocks primary intended for kneading (or compression) of a kneaded material. The screw elements also have a function of kneading a kneaded material, and the kneading blocks also have a function of transporting a kneaded material. Details of the kneading unit 13 made up of a combination of a plurality of the segment parts will be described later.

The kneading apparatus 1 of this embodiment having such a configuration will be described in terms of an operation of kneading an input raw material and extruding a kneaded material in a molten state.

First, when the raw material is input to the hopper 16 in the kneading apparatus 1, the raw material in the hopper 16 is supplied through the raw material input port 14 into the barrel 11.

In the rotary drive apparatus 17, the drive motor is rotationally driven at the constant number of rotations, and the shaft 12 is rotationally driven through the gear mechanism at the set number of rotations. As a result, the kneading unit 13 mounted on the shaft 12 is rotated along with the shaft 12.

The raw material is supplied into a space between an inner circumferential surface of the barrel 11 and an outer circumferential surface of the kneading unit 13, and is transported by the rotation of the kneading unit 13 to the tip side (the left side of FIG. 1) of the barrel 11 while going round along the inner circumferential surface of the barrel 11. In the course of this transportation, the raw material is kneaded and molten while being compressed by the kneading unit 13, turning into a kneaded material. A leftward axial direction of the shaft 12 in FIG. 1 is defined as a transport direction P of the kneaded material.

Subsequently, a constant amount of the kneaded material is continuously extruded from the barrel extrusion port 15. The kneaded material kneaded and extruded by the kneading apparatus 1 is used in injection molding as well as various other processes and uses.
(Segment Parts)

A configuration of the segment parts 21 making up the kneading unit 13 included in the kneading apparatus 1 of this embodiment will be described. Side views of segment parts used in this embodiment are shown in FIGS. 2(A), 2(B), and 2(C).

First to third segment parts 21A, 21B, 21C shown in FIGS. 2(A) to 2(C) are segment parts of the screw element type.

The first segment part 21A shown in FIG. 2(A) has an outer diameter (screw flight outer diameter) D and a first length L1 related to the outer diameter D. The second segment part 21B shown in FIG. 2(B) has the same outer diameter D as the first segment part 21A and a second length L2 shorter than the first segment part 21A. The third segment part 21C shown in FIG. 2(C) has the same outer diameter D as the first segment part 21A and a third length L3 longer than the first segment part 21A.

The second length L2 and the third length L3 are set as lengths related to the first length L1, and the first length L1 is set as a length related to the outer diameter D. Specifically, the first length L1 is set as [the outer diameter D×a coefficient a]. The second length L2 is set as [the first length L1/a coefficient b], and the third length L3 is set as [the first length L1×the coefficient b]. The third length L3 is also set to satisfy [the first length L1+the second length L2].

The first to third segment parts 21A to 21C have a double screw flight (which means that the number of screw threads is two), and the first to third lengths L1 to L3 are each set as a length corresponding to one pitch of the double screw flight. Therefore, the first to third segment parts 21A to 21C are different from each other in the lead angle of the screw flight.

The end surfaces of the first to third segment parts 21A to 21C are formed as, for example, surfaces perpendicular to the axial direction of the shaft 12 while being mounted on the shaft 12, so that the end surfaces of the segment parts can come into contact with each other without a gap.

The second segment part 21B has the screw pitch of the screw flight set narrower than the first segment part 21A and is a part having the kneading function enhanced as compared to the transporting function for the kneaded material. The third segment part 21C has the screw pitch of the screw flight set wider than the first segment part 21A and is a part having the transporting function enhanced as compared to the kneading function for the kneaded material.

Description will be made of an example of selecting a plurality of segment parts from the first to third segment parts 21A to 21C having such configurations so as to configure a segment pattern (i.e., the kneading unit 13) having a predetermined length in the axial direction of the shaft 12. It is noted that a length L0 of the exemplified segment patterns is set to the predetermined length, for example, [the first length L1+the second length L2+the third length L3].

A segment pattern 20A of the kneading unit 13 shown in FIG. 3 has the third segment part 21C, the first segment part 21A, and the second segment part 21B coupled and combined in series in the transport direction P of the kneaded material (from right to left in the axial direction of the shaft 12). The total length of all the segment parts 21 is [the third length L3+the first length L1+the second length L2], which is identical to the predetermined length L0 of the segment pattern.

The segment pattern 20A of FIG. 3 is provided with the specifications having the kneading function gradually enhanced as compared to the transporting function in series in the transport direction P of the kneaded material. Therefore, by using the segment pattern 20A as the kneading unit 13, a degree of compression or kneading can gradually be increased for the kneaded material being transported.

Figure 4:
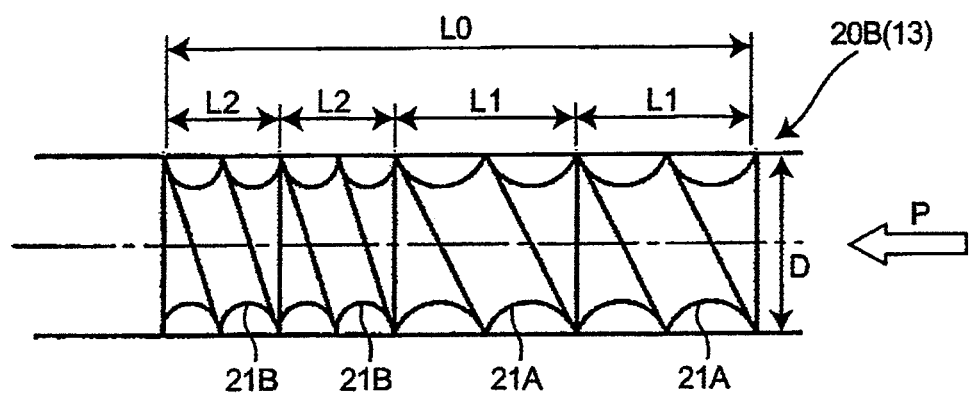
FIG. 4 is a configuration diagram of a segment pattern 20B of the kneading apparatus of this embodiment.

A segment pattern 20B of the kneading unit 13 shown in FIG. 4 has the two first segment parts 21A and the two second segment parts 21B coupled and combined in series in the transport direction P of the kneaded material. The total length of all the segment parts 21 is [(the first length L1×2)+(the second length L2×2)]. Since [the first length L1+the second length L2] is equal to the third length L3, the total length of all the segment parts 21 is [the first length L1+the second length L2+the third length L3], which is identical to the predetermined length L0 of the segment pattern.

The segment pattern 20B of FIG. 4 is provided with the specifications having the kneading function gradually enhanced as compared to the transporting function in series in the transport direction P of the kneaded material. Since the two second segment parts 21B are used, the compression function or the kneading function can be more enhanced than the segment pattern 20A of FIG. 3.

The segment pattern 20A of FIG. 3 is an example of the first segment pattern including the first and second segment parts, and the segment pattern 20B of FIG. 4 is an example of the second segment pattern including the third segment part. The segment pattern 20A and the segment pattern 20B are mounted on the shaft such that either pattern is interchangeable with the other pattern.

Figure 5:
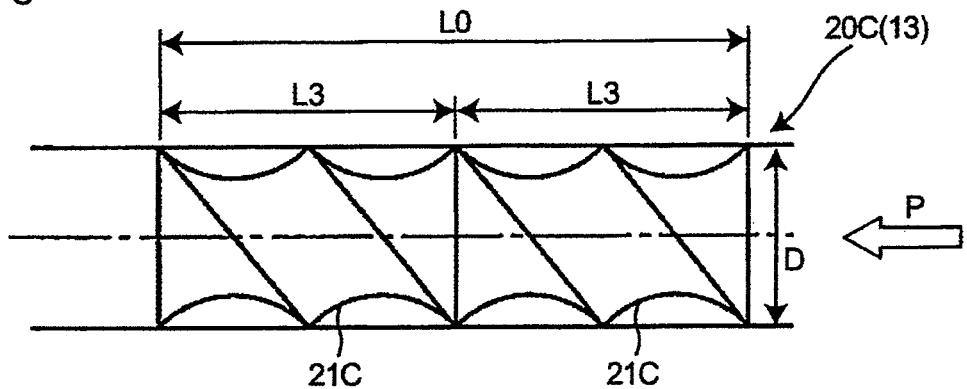
FIG. 5 is a configuration diagram of a segment pattern 20C of the kneading apparatus of this embodiment.

A segment pattern 20C of the kneading unit 13 shown in FIG. 5 is formed by coupling the two third segment parts 21C. The total length of all the segment parts 21 is [the third length L3×2]. Since the third length L3 is equal to [the first length L1+the second length L2], the total length of all the segment parts 21 is [the first length L1+the second length L2+the third length L3], which is identical to the predetermined length L0 of the segment pattern.

The segment pattern 20C of FIG. 5 can enhance the transporting function for the kneaded material.

Figure 6A:
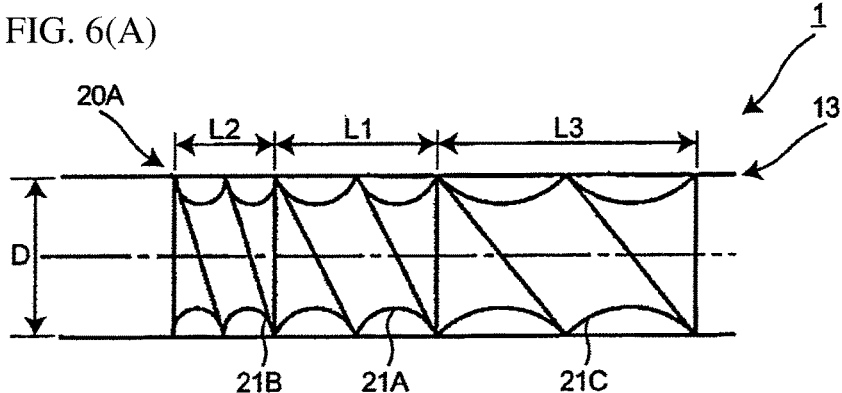
FIG. 6(A) is a configuration diagram of segment patterns of this embodiment, including a configuration diagram of a small kneading apparatus
Figure 6B:
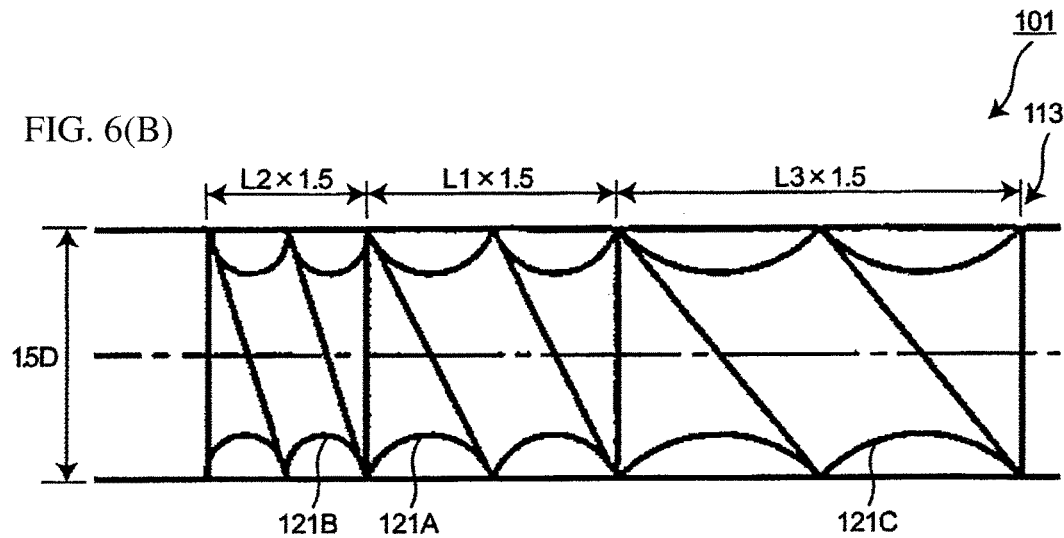
FIG. 6(B) is a configuration diagram of segment patterns of this embodiment, including a configuration diagram of a large kneading apparatus.

FIGS. 6(A) and 6(B) show configurations of kneading units 13, 113 when the kneading apparatus 1 of this embodiment is scaled up to a large kneading apparatus 101, for example.

In each of segment parts 121 of the large kneading apparatus 101 shown in FIG. 6(B), the outer diameter D of each of the segment parts 21 in the kneading apparatus 1 of FIG. 6(A) is scaled up by 1.5 (i.e., to an outer diameter 1.5 D), for example. The first to third segment parts 21A to 21C of the kneading apparatus 1 have the respective lengths L1 to L3 related to the outer diameter D. Also in the large kneading apparatus 101, first to third segment parts 121A to 121C have respective lengths related to the outer diameter 1.5 D.

Therefore, the large kneading apparatus 101 has the first segment part 121A with the length of [the first length L1×1.5], the second segment part 121B with the length of [the second length L2×1.5], and the third segment part 121C with the length of [the third length L3×1.5]. Therefore, the respective segments parts have a similarity relation between the small kneading apparatus 1 and the large kneading apparatus 101.

As described above, in the kneading apparatus 1 of this embodiment, the kneading unit 13 can be made up of the segment pattern 20 acquired by combining a plurality of the segment parts 21. The first to third segment parts 21A to 21C have the same outer diameter D and the lengths related to the outer diameter D, and the lengths have a certain correlation with each other. Particularly, the second length L2 is set to [the first length L1/the coefficient b], the third length L3 is set to [the first length L1×the coefficient b], and the third length L3 is set to [the first length L1+the second length L2].

This enables an increase in the number of combinations of the segment parts 21 applicable to the predetermined length L0 (an assembling length) acquired by combining a plurality of the segment parts 21, i.e., the number of types of the segment patterns 20. Therefore, even when the segment parts 21 different in length are interchanged and mounted on the shaft 12, the combination of the segment parts 21 can be changed with the predetermined assembling length retained. Therefore, in the kneading apparatus 1 including the kneading unit made up of a plurality of the segment parts 21, limitations on selection or interchange of the segment parts 21 can be reduced, and a degree of freedom can be increased when functions or specifications of the apparatus are changed.

Since the kneading apparatus 1 has the segment pattern of the kneading unit 13 defined as a pattern having desired functions or specifications, the transporting performance for the kneaded material can be enhanced, or a degree of kneading of the kneaded material can be adjusted, without changing the apparatus length.

Particularly, since the first to third segment parts 21A to 21C have the same outer diameter D and the lengths related to the outer diameter D, the segment parts can be scaled up such that a similarity relation is achieved. Therefore, if a small kneading apparatus is produced and verified in terms of performance thereof and the small kneading apparatus is then scaled up to produce a large kneading apparatus, a scaled-up performance can be produced by the large kneading apparatus. This is applicable not only to the case of scaling up but also to the case of scaling down, and a segment part configuration can be achieved with consideration given to scaling up or down of the apparatus.

Particularly, since the outer diameter of the segment parts 21 can be set to various dimensions (e.g., set to arbitrary dimensions including prime numbers) and the configuration of the kneading unit 13 can be a geometrically similar configuration, required apparatus capability can be provided while satisfying various dimension requirements.

MODIFICATION EXAMPLES

Examples of segment parts and segment patterns according to modification examples of this embodiment will be described.

Modification Example 1

The first to third segment parts 21A to 21C shown in FIGS. 2(A)-(C) have the screw flight in which the number S of screw threads is two, and the first to third lengths L1 to L3 are set as lengths corresponding to one pitch of the screw flight. The lengths of the segment parts are not limited to the case of the lengths corresponding to one pitch of the screw flight. For example, short segment parts or long segment parts may be used that have lengths acquired by multiplying the lengths L1 to L3 corresponding to one pitch of the screw flight by n/S (n is a natural number).

Figure 7:
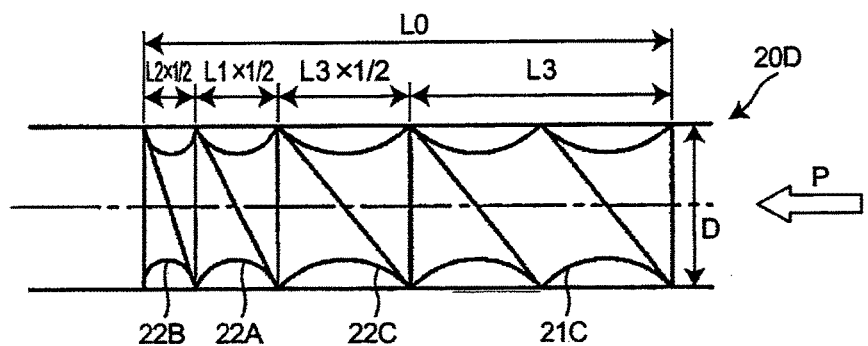
FIG. 7 is a configuration diagram of a segment pattern 20D of a kneading apparatus of a modification example 1 of this embodiment.

Such short segment parts are used in a segment pattern 20D of the kneading unit 13 shown in FIG. 7. Specifically, the short segment parts used are a first short segment part 22A acquired by multiplying the length of the first segment part 21A by ½ (i.e., 0.5 when n=1 and S=2), a second short segment part 22B acquired by multiplying the length of the second segment part 21B by ½, and a third short segment part 22C acquired by multiplying the length of the third segment part 21C by ½. The segment pattern 20D has the third segment part 21C, the third short segment part 22C, the first short segment part 22A, and the second short segment part 22B coupled and combined in series in the transport direction P of the kneaded material.

The total length of all the segment and short segment parts 21, 22 is [the third length L3+(the third length L3×½)+(the first length L1×½)+(the second length L2×½)]. Since [the first length L1+the second length L2] is equal to the third length L3, the total length of all the segment and short segment parts 21, 22 is [the first length L1+the second length L2+the third length L3], which is identical to the predetermined length L0 of the segment pattern.

In the segment pattern 20D of FIG. 7, the short segments parts 22 acquired by multiplying the lengths of the segment parts 21 by 1/S are used. Therefore, the angle (lead angle) of the screw flight relative to the axial direction of the shaft 12 can gently be increased so that the kneading function can gradually be enhanced.

Modification Example 2

Figure 8:
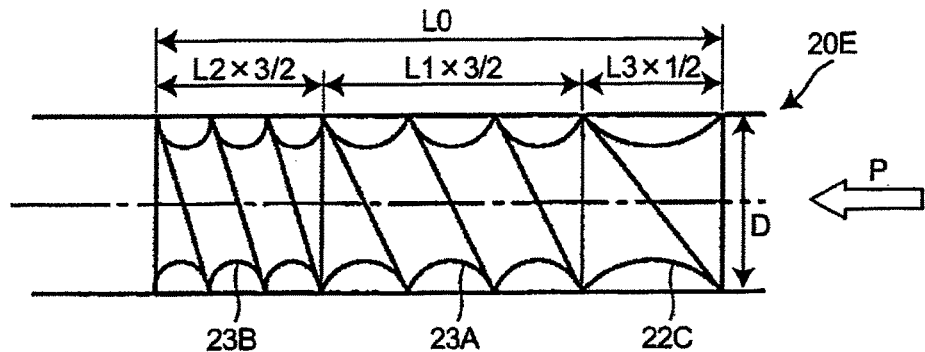
FIG. 8 is a configuration diagram of a segment pattern 20E of a kneading apparatus of a modification example 2 of this embodiment.

The short segment part 22 and long segment parts 23 are mixed and used in a segment pattern 20E of the kneading unit 13 shown in FIG. 8. Specifically, a first long segment part 23A acquired by multiplying the length of the first segment part 21A by 3/2 (i.e., 1.5 when n=3 and S=2) and a second long segment part 23B acquired by multiplying the length of the second segment part 21B by 3/2 are used in addition to the third short segment part 22C. The segment pattern 20E has the third short segment part 22C, the first long segment part 23A, and the second long segment part 23B coupled and combined in series in the transport direction P of the kneaded material.

The total length of all the short and long segment parts 22, 23 is [(the third length L3×½)+(the first length L1×3/2)+(the second length L2×3/2)]. Since [the first length L1+the second length L2] is equal to the third length L3, the total length of all the short and long segment parts 22, 23 is [the first length L1+the second length L2+the third length L3], which is identical to the predetermined length L0 of the segment pattern.

The segment pattern 20E as described above can enhance the kneading function from a position closer to the upstream side in the transport direction P of the kneaded material.

Modification Example 3

Figure 9:
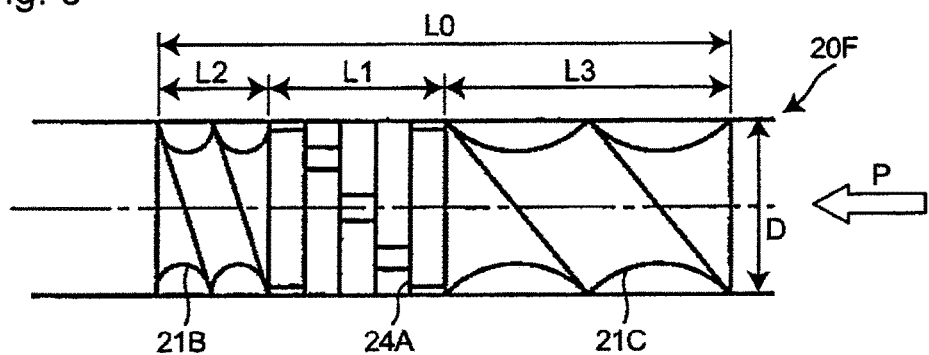
FIG. 9 is a configuration diagram of a segment pattern 20F of a kneading apparatus of a modification example 3 of this embodiment.

A segment pattern 20F of the kneading unit 13 shown in FIG. 9 has a kneading block primary intended for kneading of the kneaded material used as a segment part in combination with screw elements.

The segment pattern 20F has the third segment part 21C, a first segment part 24A that is the kneading block having the length L1, and the second segment part 21B coupled and combined in series in the transport direction P of the kneaded material. The total length of all the segment parts 21, 24 is identical to the predetermined length L0 of the segment pattern.

By combining the screw elements and the kneading block as the segment parts in this way, specifications can be provided with the enhanced kneading function for the kneaded material.

Modification Example 4

Figure 10:
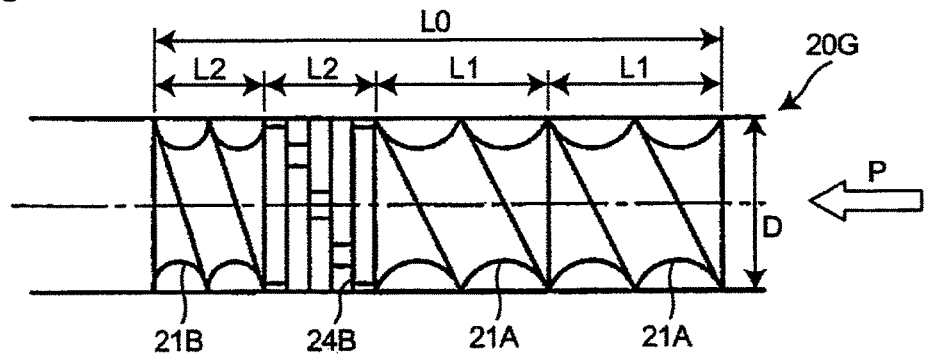
FIG. 10 is a configuration diagram of a segment pattern 20G of a kneading apparatus of a modification example 4 of this embodiment.

As in a segment pattern 20G shown in FIG. 10, a kneading block having the length L2, i.e., a second segment part 24B, may be used in combination.

For the dimensions of the segment parts described above, for example, the following dimension examples can be employed. It is noted that length dimensions (mm) are defined as values rounded off to the nearest whole number. These dimension examples and numerical examples are merely examples, and various other dimensions and numerical values are applicable.

Outer diameter D: 40 mm
Coefficient a: 1
Coefficient b: 1.618
First length L1 (D×a): 40 mm
Second length L2 (L1/b): 25 mm
Third length L3 (L1×b): 65 mm As described above, according to this embedment and modification examples, in the kneading apparatus including the kneading unit made up of a plurality of segment part, the limitations on selection or interchange of segment parts can be reduced and a segment part configuration can be achieved with consideration given to scaling up or down of the apparatus.

By using the short or long segment parts having a length related to the number S of screw threads as the segment parts, various combinations can be achieved, and the kneading unit with diversified specifications can be achieved.

By selectively using the screw elements primary intended for transportation of the kneaded material and the kneading blocks primary intended for kneading of the kneaded material in combination as the segment parts, the kneading unit with diversified specifications can be achieved.

Although the kneading apparatus 1 has a single shaft configuration including the one shaft 12 in the examples of the embodiment described above, the kneading apparatus 1 may have a multi-shaft configuration such as a configuration using two or more shafts in parallel.

Although the predetermined length of the segment parts 21 is L0=L1+L2+L3 in the examples described above, the predetermined length L0 is not limited to such a case. The length L0 of the segment parts 21 may be set according to the length required for the kneading unit 13 of the kneading apparatus 1 and may be set to a length longer than [L1+L2+L3].

The outer diameter D and the lengths L1 to L3 of the segment parts 21 may be set by rounding down/up/off to the nearest whole number in mm. Differences in dimension to this extent have little practical effect on the specifications of the kneading unit and cause no problem.

Although the number S of screw threads of the segment parts 21 is two in the examples described above, the number S of screw threads may be one, or the number S of screw threads may be three or more. Although all the segment parts 21 desirably have the same number of screw threads in the one segment pattern 20, segment parts different in the number of screw threads may be used in combination.

The segment patterns 20A to 20G described in the embodiment and modification examples described above are merely examples, and various other segment patterns can be employed. If the lengths of the segment patterns are identical to the predetermined length L0, one and another one of the segment patterns can interchangeably be mounted on the shaft 12.

Arbitrary embodiments can appropriately be combined out of the various embodiments described above so as to produce the effects of the respective embodiments.

Although this disclosure is sufficiently described in terms of the preferable embodiments with reference to the accompanying drawings, various modifications and corrections are apparent to those skilled in the art. It should be understood that such modifications and corrections are included in this discloser as long as the modifications and corrections do not depart from the range of this discloser according to the accompanying claims.

EXPLANATIONS OF LETTERS OR NUMERALS 1 kneading apparatus
11 barrel
12 shaft
13 kneading unit
14 raw material input port
15 barrel extrusion port
16 hopper
17 rotary drive apparatus
20 segment pattern
21 segment part
22 short segment part
23 long segment part

The invention claimed is:

1. A kneading apparatus comprising: a barrel; a shaft disposed and rotationally driven in the barrel; and a kneading unit made up of a plurality of segment parts detachably mounted on the shaft, wherein
the plurality of the segment parts includes:
a first segment part having an outer diameter D and a first length L1 related to the outer diameter D,
a second segment part having the outer diameter D and a second length L2 shorter than the first length L1, and
a third segment part having the outer diameter D and a third length L3 longer than the first length L1, wherein
the first length L1 is the outer diameter D×a coefficient a, the second length L2 is the first length L1/a coefficient b, the third length L3 is the first length L1×the coefficient b, and the third length L3 is the first length L1+the second length L2, and
the kneading unit has a segment pattern made up of a plurality of segment parts mounted on the shaft, and the segment pattern is mounted on the shaft such that either a first segment pattern including the first and second segment parts or a second segment pattern including the third segment part is interchangeable with the other pattern.

2. The kneading apparatus according to claim 1, wherein the length of the second segment pattern in an axial direction of the shaft is the same as the length of the first segment pattern.

3. The kneading apparatus according to claim 1, wherein each of the segment parts is a screw element or a kneading block.

4. The kneading apparatus according to claim 1,
wherein the first segment part is a first screw element having a pitch number,
wherein the second segment part is a second screw element having the pitch number, and
wherein the third segment part is a third screw element having the pitch number.

5. The kneading apparatus according to claim 1, wherein
the segment parts are screw elements having the same number S of screw threads and further include a short segment part or a long segment part having a length acquired by multiplying any of the first to third lengths L1, L2, L3 of the first to third segment parts by n/S,
n is a natural number, and the short segment part or the long segment part is included in at least one of the first and second segment patterns.

\* \* \* \* \*